UNITED STATES PATENT OFFICE.

EDUARD MÜNCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

TREATING PRODUCTS RESEMBLING CAOUTCHOUC.

1,248,888.     Specification of Letters Patent.     Patented Dec. 4, 1917.

No Drawing.     Application filed February 26, 1914. Serial No. 821,272.

*To all whom it may concern:*

Be it known that I, EDUARD MÜNCH, citizen of the German Empire, residing at Ludwigshafen-on-the-Rhine, Germany have invented new and useful Improvements in Treating Products Resembling Caoutchouc, of which the following is a specification.

In the specifications of United States Patent No. 1,238,930, it is stated that products resembling or related to caoutchouc obtained by polymerizing butadiene and homologues thereof, and which possess undesirable properties, can be improved by being subjected to the action of heat while avoiding as far as possible the presence of air and preferably by carrying out the heating under pressure less than atmospheric, whereby an indifferent gas can be passed over or through the product. It is further stated that in some cases the simultaneous employment of nitrogen compounds, such for instance, as ammonia, methylamin, anilin, amido acids, glue and albumen, is very advantageous. It is also stated that the products thus obtained can be made use of by being vulcanized, products being obtainable which more or less resemble those obtainable from synthetic or natural rubber.

I have now found that substances resembling or related to caoutchouc which have been obtained by polymerizing a butadiene hydrocarbon, and which may or may not have been subjected to further treatment, for instance, the treatment described in the aforesaid specification of Patent No. 1,238,930 or to treatment with an acid when the product is insoluble or difficultly soluble in benzene, can be heated with mixtures of a solid alkali and alkaline carbonates, whereupon the chemical and physical properties of the said products are changed and the substances, which were previously soft or adhesive and more or less easily soluble or capable of swelling in benzene become drier and more difficultly soluble in benzene or even become partly or wholly insoluble in benzene and only swell when placed therein. When the treatment with alkali or the like as hereinbefore described has been carried out, the product can be washed to remove the alkali without any substantial alteration of its properties taking place. The product so obtained can, if desired, be subsequently heated in the manner described in the aforesaid Patent No. 1,238,930 or can be treated with an acid and further, can be made use of either before or after such subsequent treatment by being vulcanized.

For the purpose of this invention I regard solid alkali alcoholate as equivalent to solid caustic alkali.

The following examples will serve to illustrate further how the invention may be carried out in practice, but the invention is not confined to these examples. The parts are by weight.

*Example 1.*

Take 100 parts of the product resembling caoutchouc which has been obtained by heating 100 parts of isoprene with 3 parts of carvene ozonid at 100° C. for about 14 days (see the Example 7 of the French Patent No. 440,173) and mix them with 1 part of solid sodium alcoholate and 0.5 parts of anhydrous sodium carbonate on the mixing rolls, while gradually raising the temperature of the rolls to about 100° C. After about half an hour the product, which was previously easily soluble in benzene and adhered to the rollers, is converted into a product which, for the greater part, is insoluble in benzene and only swells therein. It can be easily removed from the rolls in the form of a light amber colored skin and possesses good stability.

*Example 2.*

Take 100 parts of the polymerized product obtained from isoprene with sodium in the presence of carbon dioxid as described in Example 2 of the specification of the application for Patent No. 1,192,310, which has subsequently been heated with tartaric acid or acid potassium tartrate, and which consists of a soft product almost completely soluble in benzene, and mix with 3 parts of solid caustic soda and one part of anhydrous sodium carbonate on cold mixing rolls. Then gradually raise the temperature of the rolls to about 100° C., whereupon a dry light brown product is obtained which can be easily removed from the rolls. It is almost insoluble in benzene, but swells therein and in appearance resembles gutta percha.

If this product be heated for a few hours in a current of ammonia under reduced pressure at from 135–140° C. (see the aforesaid specification of Patent No. 1,238,930) further alteration takes place. The product becomes firmer and resembles balata.

*Example 3.*

Take 100 parts of the product obtainable by polymerizing 2.3-dimethyl-1.3-butadiene in the presence of carvene ozonid (see the French Patent No. 440,173) and mix with 3 parts of solid caustic potash and 1 part of calcined soda, commencing with the rolls cold and gradually heating them to a temperature of about 80–90° C. and maintaining this temperature for from half an hour to an hour. The product differs from the initial material, being very much more difficultly soluble in benzene and, to some extent, only swells therein. It yields a good stable skin.

In a similar manner, other synthetic materials resembling caoutchouc can be treated, for instance, the polymerization product described by Kondakoff in the *Journal für Praktische Chemie*, Vol. 64, pages 109–110, or the products obtainable by any other polymerization process. The quantity of the alkaline substance and the method of working can be varied within considerable limits, for instance, much lower temperatures can be employed and the substance resembling caoutchouc can also be employed in solution.

*Example 4.*

Take 100 parts of the product which has been obtained from isoprene in the presence of carvene ozonid and then heat with 3 parts of solid caustic soda and 1 part of anhydrous sodium carbonate on the hot roll at from 90–100° C. for 30 minutes, which product swells in benzene but is practically insoluble therein, and mix intimately with 10 parts of sulfur. Then heat the mass in the vulcanizing press for 2 hours and at a steam pressure of $2\frac{1}{2}$ atmospheres; an almost black elastic soft rubber-like product is obtained having considerable resistance, whereas the initial material which has not been previously treated with caustic soda, when vulcanized in the same manner gives rise to yellowish white masses in which the vulcanization is incomplete.

If the process of vulcanizing be shortened, for instance to 1 hour, a gray product is obtained.

Now what I claim is:—

1. The process of treating rubber-like butadiene polymerization products, consisting in heating them with a mixture of solid caustic alkali and an alkaline carbonate.

2. The process of treating rubber-like butadiene polymerization products, consisting in heating them with a mixture of solid caustic alkali and an alkaline carbonate, and then vulcanizing the product so treated.

In testimony whereof I have hereunto set my hand in the presence of two subscribing witnesses.

EDUARD MÜNCH.

Witnesses:
S. S. BERGER,
J. ALEC. LLOYD.